(12) United States Patent
Jarvis (10) Patent No.: US 10,311,071 B2
(45) Date of Patent: *Jun. 4, 2019

(54) SYSTEM AND METHOD FOR GENERATING RANDOM LINKED DATA ACCORDING TO AN RDF DATASET PROFILE

(71) Applicant: International Business Machines Corporation, Armonk, NY (US)

(72) Inventor: Matthew P. Jarvis, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 235 days.

This patent is subject to a terminal disclaimer.

(21) Appl. No.: 14/316,891

(22) Filed: Jun. 27, 2014

(65) Prior Publication Data

US 2015/0379159 A1     Dec. 31, 2015

(51) Int. Cl.
G06F 16/28     (2019.01)
G06F 16/2458   (2019.01)
H04L 12/911    (2013.01)
H04L 29/08     (2006.01)
G06F 11/36     (2006.01)

(52) U.S. Cl.
CPC ...... *G06F 16/2462* (2019.01); *G06F 11/3664* (2013.01); *G06F 16/285* (2019.01); *H04L 47/70* (2013.01); *H04L 67/303* (2013.01); *H04L 67/30* (2013.01)

(58) Field of Classification Search
None
See application file for complete search history.

(56) References Cited

U.S. PATENT DOCUMENTS

| | | | |
|---|---|---|---|
| 8,429,179 B1 | 4/2013 | Mirhaji | |
| 2006/0242167 A1* | 10/2006 | Singh | G06F 17/30067 |
| 2010/0082651 A1 | 4/2010 | Akolkar et al. | |
| 2012/0232926 A1* | 9/2012 | Boyle | G06Q 10/04 705/3 |
| 2013/0006984 A1 | 1/2013 | Duan et al. | |
| 2013/0262443 A1 | 10/2013 | Leida et al. | |
| 2014/0214857 A1* | 7/2014 | Srinivasan | G06F 17/30908 707/748 |

(Continued)

FOREIGN PATENT DOCUMENTS

| | | |
|---|---|---|
| CN | 103116625 A | 5/2013 |
| WO | 2012102860 A1 | 8/2012 |

OTHER PUBLICATIONS

Muhlesien et al. "Web Data Commons—Extracting Structured Data From Two Large Web Corpora," Apr. 2012, 4th Linked Data on the Web Workshop.*

(Continued)

*Primary Examiner* — Charles D Adams
(74) *Attorney, Agent, or Firm* — Brian J. Colandreo, Esq.; Jeffrey T. Placker, Esq.; Holland & Knight, LLP (57) ABSTRACT

A method, computer program product, and computer system for gathering statistics, by a computing device, for a set of resources associated with a framework. A profile is generated based upon, at least in part, the gathered statistics. A data set is selected for generation of a new resource. The new resource is generated using the profile generated based upon the gathered statistics.

10 Claims, 4 Drawing Sheets

(56) References Cited

U.S. PATENT DOCUMENTS

2014/0379755 A1* 12/2014 Kuriakose ........... G06F 17/3043
  707/780
2015/0019531 A1* 1/2015 Bursey .............. G06F 17/30241
  707/722

OTHER PUBLICATIONS

Langegger et al. "RDFStats—An Extensible RDF Statistics Generator and Library," 2009, $20^{th}$ International Workshop on Database and Expert Systems Application, pp. 79-83.*

Garcia et al., "Analysis of Big Data Technologies and Methods," IEEE Seventh International Conference on Semantic Computing, 2013, http://ieeexplore.ieee.org/xpl/articleDetails.jsp?tp=&arnumber=6693524&searchWithin%3DRDF+Datasets%26queryText%3DRDF, pp. 244-251.

Author Unknown, "Apples and Oranges: A Comparison of RDF Benchmarks and Real RDF Datasets," Paper ID: 304, SIGMOD 2011, http://www.csd.uoc.gr/~hy561/papers/benchmarking/ApplesandOrangesAComparisonofRDFBenchmarksandRealRDFDatasets.pdf, pp. 1-12.

Blum et al., Grr: Generating Random RDF, School of Computer Science and Engineering, The Hebrew University of Jerusalem, pp. 1-15.

\* cited by examiner

SYSTEM AND METHOD FOR GENERATING RANDOM LINKED DATA ACCORDING TO AN RDF DATASET PROFILE

BACKGROUND

The ability to quickly profile and build large data sets both for analysis and testing (e.g., scale, performance, functional, etc.) may be beneficial to quickly delivering stable enterprise products. It may be necessary to automate the generation of very large datasets, since real-world datasets of that size may not be available. To obtain realistic measurements from testing, the randomly generated data may be required to have many of the same characteristics as real-world data. For example, realistic numbers of resources of each type, realistic linkages between those resources, realistic values for numeric fields, realistic size and content for string fields, etc.

To this end, data generators typically have a great deal of domain specific knowledge built in. For instance, some data generators may know about the different types of resources that may need to be created and they may know how to generate reasonable values for each of the fields that describe that resource. Generally, this means that different data generators may be needed for different applications, and those generators may require updates whenever the "shape" of an application's data changes (e.g., new fields are added, new resource types are added, the expected values for a field change, etc).

Other generators may allow more flexibility, but may require users to learn a new language used for specifying data generation rules. The shape of the data may be required to be described by a set of data generation rules and those rules may also require updates whenever the shape of the desired dataset changes. This may also require that the user creating the rules have an in-depth knowledge of the underlying resource description framework (RDF) representations created by the application the user wishes to test.

BRIEF SUMMARY OF DISCLOSURE

In one implementation, a method, performed by one or more computing devices, may include but is not limited to gathering statistics, by a computing device, for a set of resources associated with a framework. A profile may be generated based upon, at least in part, the gathered statistics. A data set may be selected for generation of a new resource. The new resource may be generated using the profile generated based upon the gathered statistics.

One or more of the following features may be included. The framework may include a resource description framework. The data set may include at least one of an existing dataset for augmentation and a new dataset for creation. Gathering statistics may include running a query on the set of resources. Gathering statistics may include reading the set of resources one quad at a time into memory. The statistics may include unique rdf:type objects in the set of resources. The statistics may include predicates that appear in resources for the unique rdf:type objects, wherein the statistics may further include statistics about the unique rdf:type objects for each predicate.

In another implementation, a computing system includes a processor and a memory configured to perform operations that may include but are not limited to gathering statistics for a set of resources associated with a framework. A profile may be generated based upon, at least in part, the gathered statistics. A data set may be selected for generation of a new resource. The new resource may be generated using the profile generated based upon the gathered statistics.

One or more of the following features may be included. The framework may include a resource description framework. The data set may include at least one of an existing dataset for augmentation and a new dataset for creation. Gathering statistics may include running a query on the set of resources. Gathering statistics may include reading the set of resources one quad at a time into memory. The statistics may include unique rdf:type objects in the set of resources. The statistics may include predicates that appear in resources for the unique rdf:type objects, wherein the statistics may further include statistics about the unique rdf:type objects for each predicate.

In another implementation, a computer program product resides on a computer readable storage medium that has a plurality of instructions stored on it. When executed by a processor, the instructions cause the processor to perform operations that may include but are not limited to gathering statistics for a set of resources associated with a framework. A profile may be generated based upon, at least in part, the gathered statistics. A data set may be selected for generation of a new resource. The new resource may be generated using the profile generated based upon the gathered statistics.

One or more of the following features may be included. The framework may include a resource description framework. The data set may include at least one of an existing dataset for augmentation and a new dataset for creation. Gathering statistics may include running a query on the set of resources. Gathering statistics may include reading the set of resources one quad at a time into memory. The statistics may include unique rdf:type objects in the set of resources. The statistics may include predicates that appear in resources for the unique rdf:type objects, wherein the statistics may further include statistics about the unique rdf:type objects for each predicate.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

System Overview:

As will be discussed in greater detail below, the present disclosure may describe, e.g., a system and method for profiling an existing resource description framework (RDF) dataset and generating new data that may be in line with that profile in a way that may be agnostic to the shape of the data.

Figure 1:
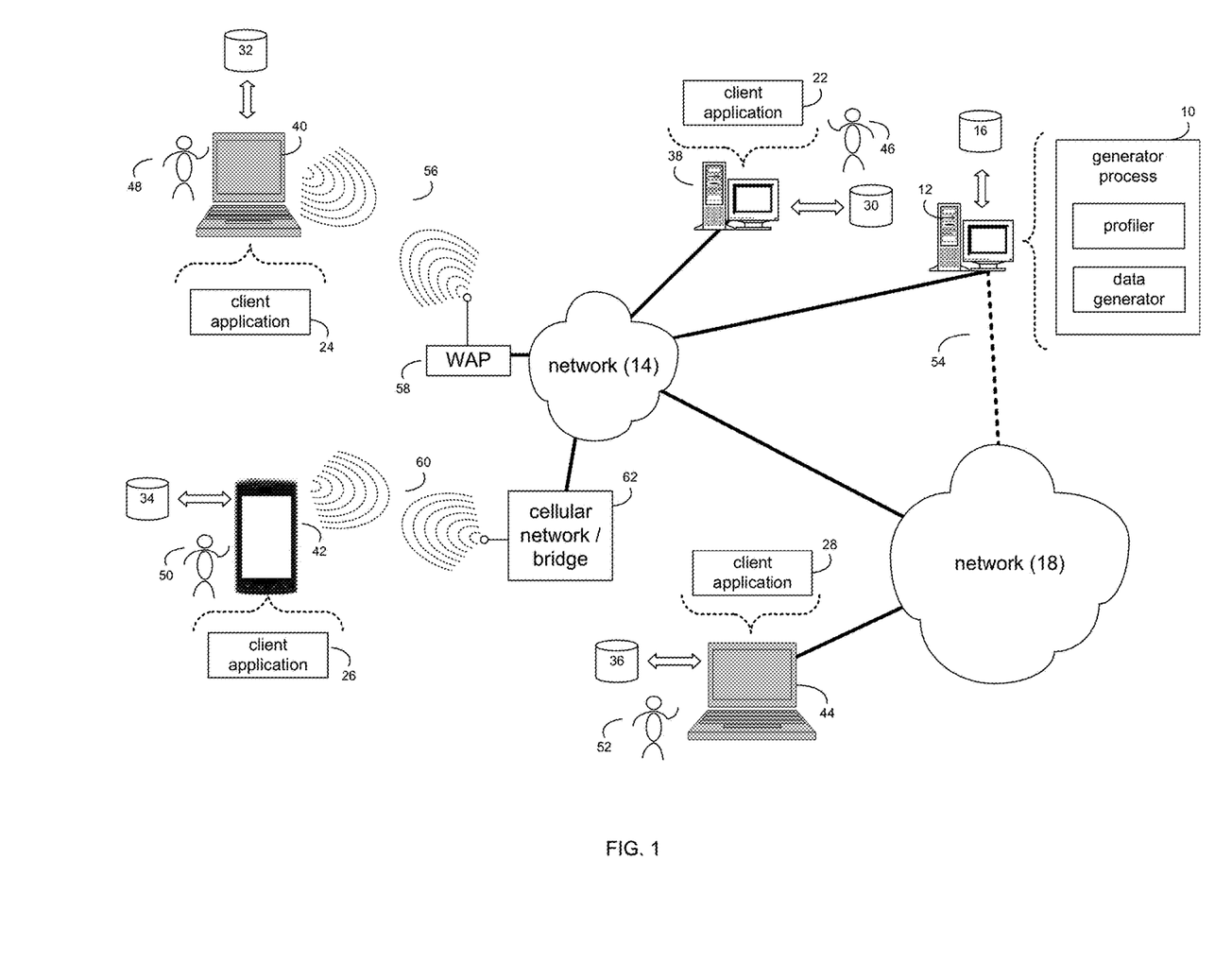
FIG. 1 is an illustrative diagrammatic view of a generator process coupled to a distributed computing network according to one or more implementations of the present disclosure.

For instance, given a small representative dataset, generator process 10 may enable the generation of a dataset of nearly any size that may have many of the same characteristics as the original dataset. Generator process 10 may generate an entirely new dataset, and/or may augment an existing dataset, creating links between newly generated and existing resources.

Generator process 10 may be much more flexible than typical data generators that may have domain specific knowledge built in, since, e.g., generator process 10 is able to work with any RDF data. The same data generator of generator process 10 may be used for any application that may produce RDF data. Additionally, generator process 10 may be much easier to use than typical data generators that may be driven by a manually specified set of data generation rules. For example, a user that may be familiar with the application to be tested may build a representative dataset by, e.g., using the application. The user does not necessarily require any knowledge of the underlying RDF representations created by the application and the user need not learn a new language for specifying data generation rules.

Moreover, generator process 10 may enable the generation of "very large datasets" quickly. For instance, as a non-limiting example, starting with a sample dataset of around 37 MB in size, generator process 10 may generate a 2.7 TB dataset (10 billion quads) in about 12 hours.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is shown generator process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, generator process 10 may gather statistics, by a computing device, for a set of resources associated with a framework. A profile may be generated based upon, at least in part, the gathered statistics. A data set may be selected for generation of a new resource. The new resource may be generated using the profile generated based upon the gathered statistics.

The instruction sets and subroutines of generator process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Generator process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Generator process 10 may be accessed via client applications 22, 24, 26, 28. Generator process 10 may be a stand alone application, or may be an applet/application/script/extension that may interact with and/or be executed within one or more of client applications 22, 24, 26, 28. One or more of client applications 22, 24, 26, 28 may be a stand alone application, or may be an applet/application/script/extension that may interact with and/or be executed within and/or be a component of generator process 10. Examples of client applications 22, 24, 26, 28 may include, but are not limited to, e.g., a standard and/or mobile web browser, an email client application, a textual and/or a graphical user interface, a customized web browser, a plugin, an Application Programming Interface (API), a custom application, or any application to be tested. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of generator process 10 (and vice versa). Accordingly, generator process 10 may be a purely server-side application, a purely client-side application, or a hybrid server-side/client-side application that is cooperatively executed by one or more of client applications 22, 24, 26, 28 and/or generator process 10.

As one or more of client applications 22, 24, 26, 28, and generator process 10, taken singly or in any combination, may effectuate some or all of the same functionality, any description of effectuating such functionality via one or more of client applications 22, 24, 26, 28 and/or generator process 10, and any described interaction(s) between one or more of client applications 22, 24, 26, 28 and/or generator process 10 to effectuate such functionality, should be taken as an example only and not to limit the scope of the disclosure.

Users 46, 48, 50, 52 may access computer 12 and generator process 10 (e.g., using one or more of client electronic devices 38, 40, 42, 44) directly through network 14 or through secondary network 18. Further, computer 12 may be connected to network 14 through secondary network 18, as illustrated with phantom link line 54. Generator process 10 may include one or more user interfaces, such as browsers and textual or graphical user interfaces, through which users 46, 48, 50, 52 may access generator process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
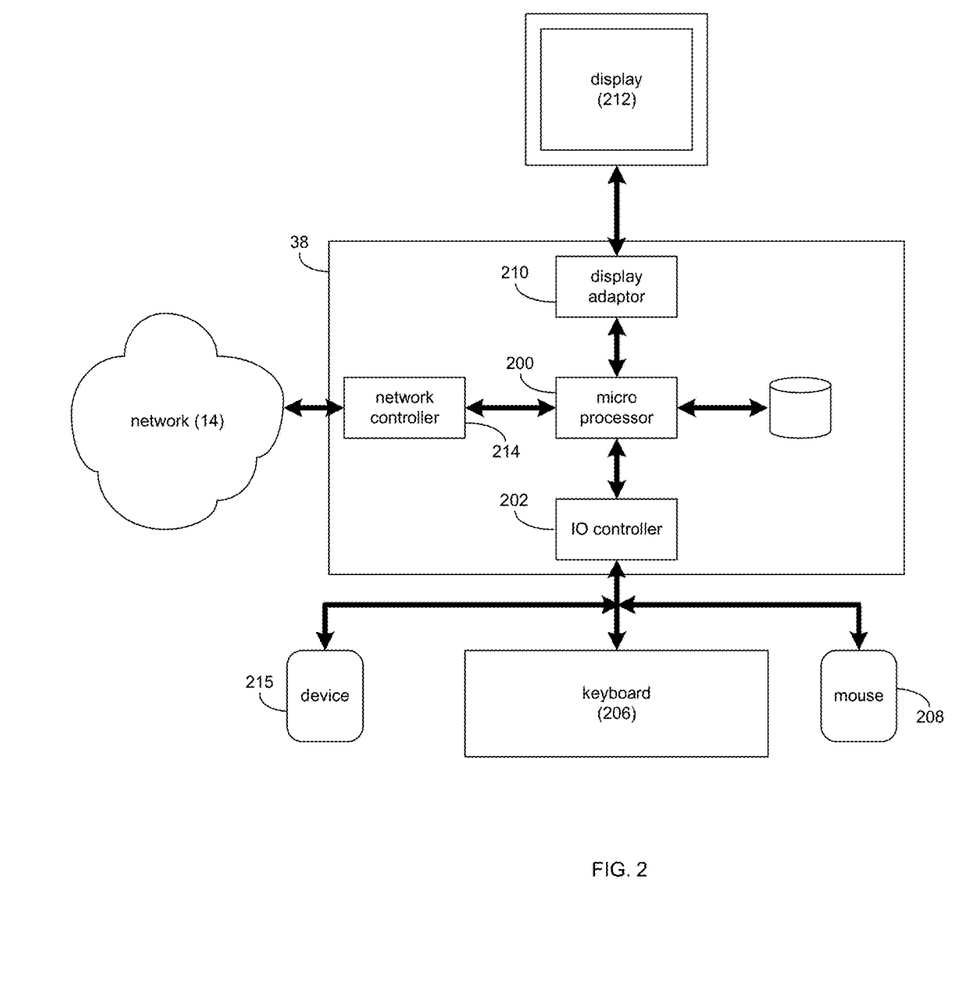
FIG. 2 is a diagrammatic view of a client electronic device of FIG. 1 according to one or more implementations of the present disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, generator process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

The Generator Process:

As discussed above and referring also to FIGS. 3-4, generator process 10 may gather 300 statistics, by a computing device, for a set of resources associated with a framework. A profile may be generated 302 by generator process 10 based upon, at least in part, the gathered 300 statistics. Generator process 10 may select 304 a data set for generation of a new resource. The new resource may be generated 306 by generator process 10 using the profile generated 302 based upon the gathered 300 statistics.

Figure 3:
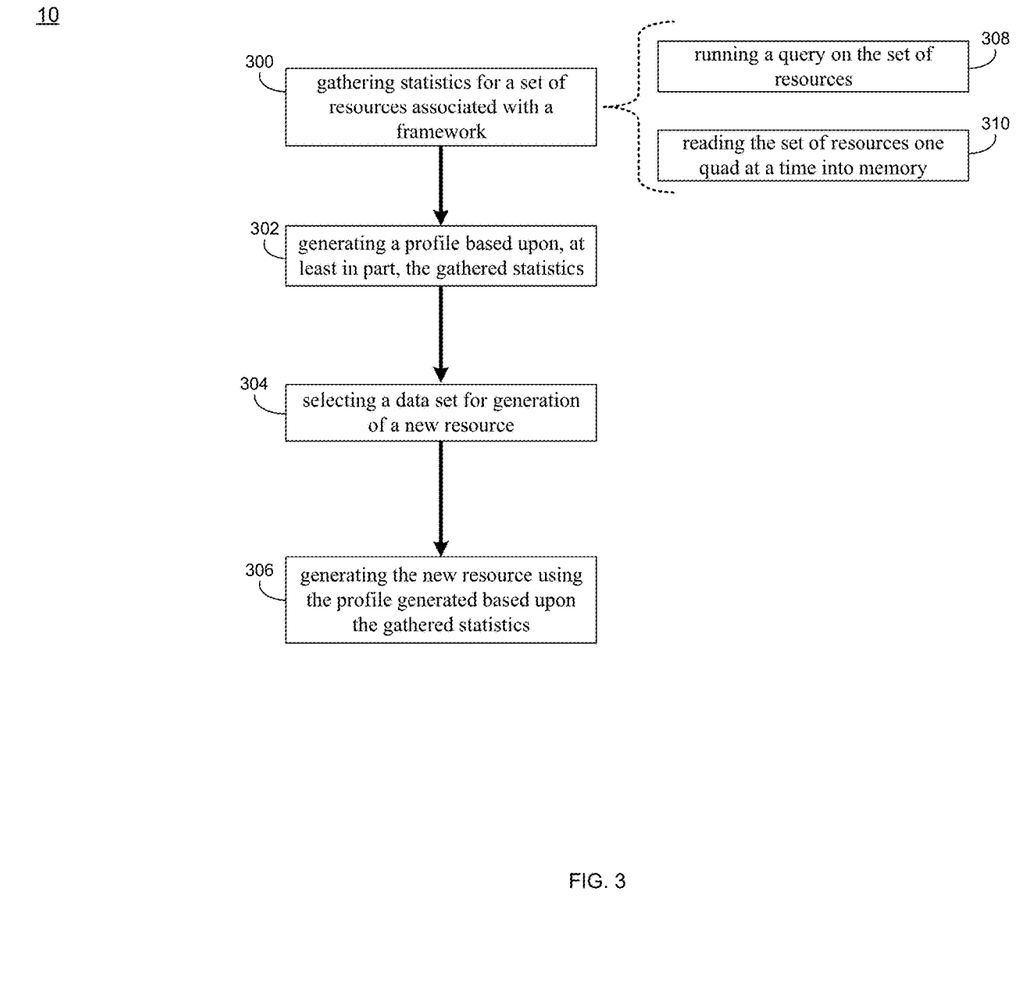
FIG. 3 is an illustrative flowchart of the generator process of FIG. 1 according to one or more implementations of the present disclosure.
Figure 4:
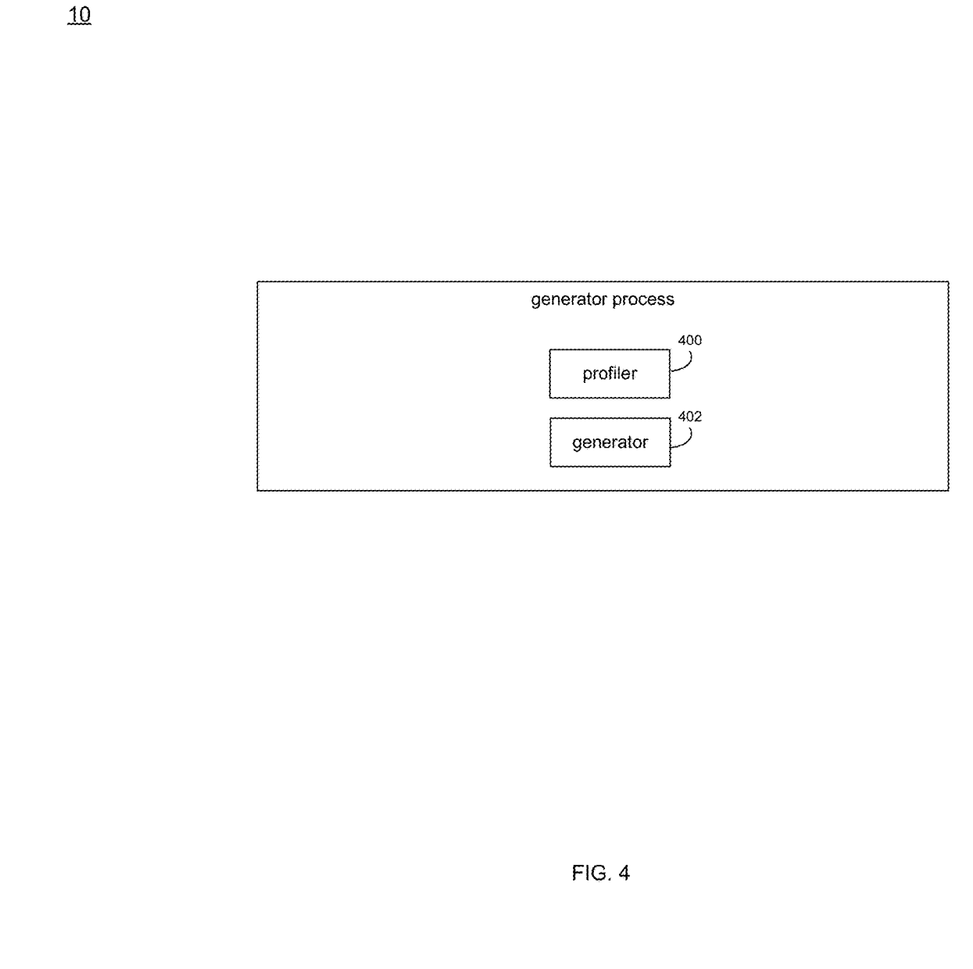
FIG. 4 is an illustrative diagrammatic view of the generator process of FIG. 1 according to one or more implementations of the present disclosure.

As noted above, generator process 10 may profile an existing resource description framework (RDF) dataset and generate new data that may be in line with that profile in a way that may be agnostic to the shape of the data. For instance, given a small representative dataset, generator process 10 may enable the generation of a dataset of nearly any size that may have many of the same characteristics as the original dataset.

In some implementations, generator process 10 may gather 300 statistics, by a computing device, for a set of resources associated with a framework. The framework may include a resource description framework. However, it will be appreciated that other frameworks may be used without departing from the scope of the disclosure. As such, the use of a resource description framework should be taken as an example only and not to limit the scope of the disclosure.

In some implementations, and referring at least to FIG. 4, generator process 10 may include a resource description framework (RDF) data profiler (e.g., profiler 400) and an RDF data generator (e.g., generator 402). In some implementations, gathering 300 statistics may include running 308 a query on the set of resources. For instance, as will be discussed in greater detail below, profiler 400 may gather statistics about, e.g., an existing RDF dataset by, e.g., running SPARQL queries on that dataset. The dataset may be stored at, e.g., storage device 16. As will also be discussed in greater detail below, data generator 402 may consume the information gathered by profiler 400 and may generate new random resources that may conform to the statistics gathered by profiler 400.

As noted above, in some implementations, gathering 300 statistics may include generator process 10 running 308 a query on the set of resources. In some implementations, the statistics may include unique rdf:type objects in the set of resources. In some implementations, the statistics may include predicates that appear in resources for the unique rdf:type objects, wherein the statistics may further include statistics about the unique rdf:type objects for each predicate. For instance, profiler 400 may run, e.g., SPARQL Protocol and RDF Query Language (SPARQL) (or other relevant query language), one or more queries to gather 300 statistics about some or all of the resources in the sample dataset (e.g., the above-noted set of resources) provided. Profiler 400 may begin by gathering 300 a list or other data construct of some or all the unique rdf:type objects in the sample dataset. In some implementations, for each type that is found, profiler 400 may gather 300 a list of some or all predicates that may appear in resources of that type. In some implementations, for each predicate that is found, profiler 400 may gather 300 statistics about the objects of that predicate for resources of that type.

In some implementations, a profile may be generated 302 by generator process 10 based upon, at least in part, the gathered 300 statistics. For example, the (final) profile that may be generated 302 may include the following example and non-limiting information: (1) Distribution of resources by type (e.g., total number of resources of each type, and the percentage); (2) For each predicate, the minimum, maximum, and average number of times that predicate occurs in resources of this type; (3) For each predicate, the type of value expected in the object; (4) For predicates where varying string values are observed in the object by generator process 10, the minimum, maximum, average, and standard deviation of the string length; (5) For predicates where a fixed set of string values are repeatedly observed in the object by generator process 10, the set of values observed and the number of times each value occurred; (6) For predicates with a numeric value expected in the object, the minimum, maximum, average, and standard deviation of the value; (7) For predicates with a date value expected in the object, the minimum, maximum, average, and standard deviation of the value (converted to unix time); (8) For predicates with a Boolean value expected in the object, the percentage of the observed values which were 'true'; (9) For predicates with a URI value expected in the object where the URI points to another resource in the dataset, the rdf:type of that resource; (10) For predicates with a URI value expected in the object where the URI is not found in the dataset, the set of values observed by generator process 10 and the number of times each value occurred.

In some implementations, gathering 300 statistics may include generator process 10 reading 310 the set of resources one quad at a time into memory. For example, generator process 10 may reading 310 the dataset (e.g., the above-noted set of resources) one quad at a time into memory (e.g., an in-memory Java-based data structure), which may provide more flexibility and may provide better performance than using SPARQL (or other relevant query language). In some implementations, profiler 400 may read 310 data in nquads format and build up a data structure that groups quads by the graph URI. Some or all of the quads that may make up a graph may define a single resource. After generator process 10 groups the data by each graph URI, profiler 400 may iterate over each of the graphs, gathering 300 the relevant statistics about each one. In some implementations, profiler 400 may first determines the rdf:type of the graph by looking for quads in the graph with the graph URI as the subject and rdf:type as the predicate. The statistics that are gathered 300 may be first grouped by the rdf:type of the graph. In some implementations, most quads in a graph may be making statements about that same resource (i.e., the graph URI and the subject URI may be the same), but that is not always true. Statistics may next be grouped by the subject of the quads in each graph as follows in the example: (A) One group for all of the predicates and objects observed by generator process 10 where the graph URI and subject URI are the same; (B) If the subject is a URI that points to another graph in the dataset, one group for the rdf:type of each subject that is observed by generator process 10; (C) If the subject is a URI that is not a graph in the dataset, one group for the rdf:type of each subject that is observed by generator process 10 (D) If the subject is a blank node (e.g., an id that may be referenced by other quads in the same graph, or is the subject of certain triples in a graph and the object of others), one group for the rdf:type of each subject that is observed by generator process 10.

For each subject grouping, profiler 400 may gather 300 statistics about each predicate that is observed (e.g., number of occurrences within that subject and statistics about the object values for that predicate). The object statistics that are gathered 300 may be very similar to the above-noted object statistics with one or more additions. For example, profiler 400 may recognize different object types, gather 300 statistics about each separately and gather 300 information about the distribution. For example, a certain predicate may contain a string value in some cases and a numeric value in other cases. Profiler 400 may recognize that, e.g., ⅔ of the time, the predicate has a string value with certain properties and, e.g., ⅓ of the time the predicate has a numeric value with other properties.

In some implementations, generator process 10 may recognize object values that point to blank nodes or other subject URIs that may be contained in the same graph. For instance, profiler 400 may assign each subject grouping a unique identifier that is being used in the object statistics to identify cases where the object of a quad may be a reference to the subject of one or more other quads in this graph.

In some implementations, generator process 10 may select 304 a data set for generation of a new resource. In some implementations, the data set may include at least one of an existing dataset for augmentation and a new dataset for creation. In some implementations, if a user (e.g., user 46) specifies, e.g., via a user interface of generator process 10, a dataset to be augmented, data generator 402 may include resources from that dataset when selecting (e.g., randomly) a resource of a certain type to which to link. Thus, multiple runs of generator 402 may produce a single fully linked dataset.

In some implementations, the new resource may be generated 306 by generator process 10 using the profile generated 302 based upon the gathered 300 statistics. For example, generator 402 may consume the above-noted statistics gathered 300 by profiler 400, generate 306 new random resources based on those statistics and produce a stream of nquads formatted output. Generator 402 may use inputs for the number of resources that may be generated 306 and, e.g., a sample text file that may be used for producing string values. Generator 402 may optionally accept a dataset to be augmented and a minimum date for generating date values.

For each resource that is to be generated 306, generator 402 may randomly select the type of resource to be generated 306 based on the type distribution from the above-noted profile. Given the type of resource to be generated 306, generator 402 may decide to add a triple with each predicate in the profile for that resource type zero or more times based on, at least in part, the above-noted minimum, maximum, and average number of occurrences of that predicate in resources of that type. When generating 306 the object of a triple, generator 402 may use statistics about that object from the above-noted profile as follows: (1) For objects with varying string values in the profile, generator 402 may randomly decide on a length of the string based on the minimum, maximum, average, and standard deviation of the string length from the profile. Generator 402 may add words from the provided sample text file to the string value until the length of the string is greater than or equal to the randomly determined string length; (2) For objects with a fixed set of string values, one of the values from the profile may be selected at random (or otherwise) based on the distribution of those values in the profile; (3) For objects with a numeric value, a value may be randomly generated 306 using the minimum, maximum, average, and standard deviation from the profile; (4) For objects with a date value, a value may be randomly generated 306 using the minimum, maximum, average, and standard deviation from the profile if no minimum date was specified as input. Otherwise, a random value between the minimum date and the current date may be generated 306; (5) For objects with a Boolean value, a value may be randomly chosen by generator process 10 with the same true/false probability as in the profile; (6) For objects with a URI value where the profile specifies an rdf:type for the object, generator 402 may randomly select an object of that type to which to link. If no object of that type exists, one may be generated by generator process 10; (7) For objects with a URI value where the profile specifies a fixed set of possible values, a value may be selected at random by generator process 10 based on, at least in part, the distribution of the values in the profile.

In some implementations, such as where generator process 10 reads 310 the set of resources one quad at a time into memory, generator 402 may first pick a graph type to create based on the distribution in the above-noted profile. For that graph, generator 402 may determine which subjects to generate 306 based on, at least in part, the subjects that were observed in the profile by generator process 10. For each subject, the corresponding predicates and objects may be generated 306 according to the profile.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, and combinations thereof) are possible without departing from the scope of the disclosure defined in the appended claims.

What is claimed is:

1. A computer program product residing on a non-transitory computer readable storage medium having a plurality of instructions stored thereon which, when executed by a processor, cause the processor to perform operations comprising:
    gathering statistics for a plurality of characteristics of a set of resources associated with a framework, wherein gathering statistics includes reading the set of resources in an N-Quads format, wherein the N-Quads format includes a graph URI, wherein the statistics include unique rdf:type objects in the set of resources and further include predicates that appear in resources for the unique rdf:type objects;
    generating a profile based upon, at least in part, the gathered statistics, wherein the profile generated includes, at least in part, a minimum, maximum, average, and standard deviation of at least one of a string value and a numerical value for each predicate;
    selecting a data set for generation of a new resource associated with the framework with one or more of the plurality of characteristics of the set of resources based upon, at least in part, the graph URI, wherein the data set includes an existing dataset for augmentation;
    generating the new resource associated with the framework with the one or more of the plurality of characteristics of the set of resources using the profile generated based upon the gathered statistics, including selecting a graph type to create based on a distribution included within the profile, wherein generating the new resource associated with the framework includes generating new, random data with the one or more of the plurality of characteristics of the set of resources using the profile, wherein, upon selecting the existing dataset for augmentation, generating the new resource associated with the framework includes randomly selecting a resource from the existing dataset for augmentation to which to link, and producing a single fully linked dataset; and
    testing an application with the new resource associated with the framework.

2. The computer program product of claim 1 wherein the framework includes a resource description framework.

3. The computer program product of claim 1 wherein the data set includes at least one of an existing dataset for augmentation and a new dataset for creation.

4. The computer program product of claim 1 wherein gathering statistics includes running a query on the set of resources.

5. The computer program product of claim 1 wherein gathering statistics includes reading the set of resources one quad at a time into memory.

6. The computer program product of claim 1 wherein the statistics include statistics about the unique rdf:type objects for each predicate.

7. A computing system including a processor and a memory configured to perform operations comprising:
    gathering statistics for a plurality of characteristics of a set of resources associated with a framework, wherein gathering statistics includes reading the set of resources in an N-Quads format, wherein the N-Quads format includes a graph URI, wherein the statistics include unique rdf:type objects in the set of resources and further include predicates that appear in resources for the unique rdf:type objects;
    generating a profile based upon, at least in part, the gathered statistics, wherein the profile generated includes, at least in part, a minimum, maximum, average, and standard deviation of at least one of a string value and a numerical value for each predicate;
    selecting a data set for generation of a new resource with one or more of the plurality of characteristics of the set of resources based upon, at least in part, the graph URI, wherein the data set includes an existing dataset for augmentation;
    generating the new resource associated with the framework with the one or more of the plurality of characteristics of the set of resources using the profile generated based upon the gathered statistics, including selecting a graph type to create based on a distribution included within the profile, wherein generating the new resource associated with the framework includes generating new, random data with the one or more of the plurality of characteristics of the set of resources using the profile, wherein, upon selecting the existing dataset for augmentation, generating the new resource associated with the framework includes randomly selecting a resource from the existing dataset for augmentation to which to link, and producing a single fully linked dataset; and testing an application with the new resource associated with the framework.

8. The computing system of claim 7 wherein gathering statistics includes running a query on the set of resources.

9. The computing system of claim 7 wherein gathering statistics includes reading the set of resources one quad at a time into memory.

10. The computing system of claim 7 wherein the statistics include statistics about the unique rdf:type objects for each predicate.

* * * * *